United States Patent [19]
Carlson

[11] Patent Number: 5,833,853
[45] Date of Patent: *Nov. 10, 1998

[54] RADIAL-FLOW FILTER AND METHOD OF MANUFACTURE

[75] Inventor: Robert A. Carlson, Lake Forest, Ill.

[73] Assignee: American Metal Fibers, Inc., Lake Bluff, Ill.

[*] Notice: The term of this patent shall not extend beyond the expiration date of Pat. No. 5,711,879.

[21] Appl. No.: 937,369

[22] Filed: Sep. 25, 1997

Related U.S. Application Data

[63] Continuation of Ser. No. 610,459, Mar. 4, 1996, Pat. No. 5,711,879.

[51] Int. Cl.⁶ .................................................. B01D 29/21
[52] U.S. Cl. ......................... 210/497.01; 55/520; 55/525; 55/526; 55/DIG. 5; 29/896.6; 29/896.61; 29/896.62; 29/902
[58] Field of Search ............................ 210/497.01, 497.1; 55/520, 525, 526, DIG. 5; 29/896.6, 896.61, 896.62, 902

[56] References Cited

U.S. PATENT DOCUMENTS

| | | |
|---|---|---|
| 2,217,370 | 10/1940 | Johnston . |
| 2,819,800 | 1/1958 | Goodloe . |
| 4,225,442 | 9/1980 | Sundberg et al. . |
| 4,240,908 | 12/1980 | Tremblay et al. . |
| 4,434,054 | 2/1984 | Livesey et al. . |
| 4,473,472 | 9/1984 | Muller ...................................... 210/458 |
| 5,039,413 | 8/1991 | Harwood et al. ..................... 210/497.1 |
| 5,230,726 | 7/1993 | Smith et al. .......................... 210/497.1 |
| 5,290,446 | 3/1994 | Degen et al. ......................... 210/497.1 |
| 5,508,370 | 4/1996 | Kraft et al. . |

*Primary Examiner*—W. L. Walker
*Attorney, Agent, or Firm*—Dorn, McEachran Jambor & Keating

[57] ABSTRACT

A method of manufacture of a radial-flow filter particularly suitable for use as an input filter in a subterranean fluid (oil, gas, water) well starts with a length L of multi-perforate pipe, which may be an integral part of the production tubing of the well. The pipe is mounted in an engine lathe with the perforated length L between the headstock and the tailstock of the lathe. With the pipe rotating, a strip of metal wool, preferably stainless steel wool, is wrapped around the pipe in repeated, overlapping helical layers each aligned at an acute angle X to the pipe axis, with adjacent layers angularly displaced by an angle 2X. The completed filter may have a tubular wire mesh around the pipe, between the pipe and the innermost layer of steel wool, and a multi-perforate sheath over the outermost layer of wool.

10 Claims, 5 Drawing Sheets

RADIAL-FLOW FILTER AND METHOD OF MANUFACTURE

This patent application is a continuation of my prior application Ser. No. 08/610,459 filed Mar. 4, 1996, which is now U.S. Pat. No. 5,711,879.

BACKGROUND OF THE INVENTION

The intake of many subterranean fluid wells (oil, gas, sulfur, water, etc.) often includes a filter to screen out sand and like particulate impurities from the fluid before the fluid is pumped to the surface. If some form of filter is not provided for fluid entering the well, sand and other impurities entrained in the fluid may materially reduce the effective life of the well pump and/or other apparatus to which the well is connected.

The input filter for a subterranean well is frequently a radial-flow filter. Generally, this kind of filter is tubular in configuration and encompasses a production tube that has a multiplicity of perforations to admit fluid radially into the production conduit. From the point of admission, the fluid flows axially upwardly within the tube. When the tube is a part of the production tubing for a subterranean wells the fluid flows upwardly to the surface of the earth; pumping is usually required. Of course, the direction of flow may be reversed in the filter. That is, the fluid to be filtered may enter the tube axially and flow outwardly through tube perforations and through an encompassing filter into a chamber or passage for the filtered fluid.

One of the better examples of a radial-flow filter applied to durable use in a subterranean fluid well is Johnston U.S. Pat. No. 2,217,270. In that patent a metal mesh filter is helically wound onto a perforated pipe; plural layers of mesh may be applied. The mesh should have quite small apertures to filter out sand and other fine particles and hence may be rather expensive and difficult to manufacture if the filter is to be effective. But filters of this kind, when used commercially, frequently present substantial problems both operationally and economically.

Another material that has been used in radial-flow filters, including input filters a employed in subterranean wells, is a compressed, felt-like filter wool. The wool may be made of ordinary steel fibers, stainless steel fibers, or other metal (e.g. brass) fibers. The best operational life is usually achieved with stainless steel metal wool, justifying the relatively high price of the stainless steel. With a metal wool filter material there is little difficulty in restricting passage size, so that sand and like impurities cannot pass through the filter, and fluid flow is not cut off. But known radial-flow filters for such wells continue to present appreciable difficulties operationally, economically, and in manufacture.

SUMMARY OF INVENTION

It is an object of the invention, therefore, to provide a new and improved method of manufacturing a radial-flow filter, suitable for use as an input filter for a subterranean fluid well, that effectively solves the foregoing problems.

A specific object of the invention is to provide a new and improved method of manufacturing a radial-flow filter that is simple and inexpensive.

Another object of the invention is to provide a new and improved long radial-flow filter of previously unknown construction that is simple, inexpensive and long-lived.

Accordingly, in one embodiment the invention relates to the method of manufacturing a radial-flow filter, suitable for use as an input filter for the production tubing of a subterranean fluid well, which tubing has a predetermined outer diameter. The method comprises the following steps:

A. providing a preselected length L of a multiperforate pipe have a given outer diameter D1;

B. mounting the length of multi-perforate pipe in a lathe with the length L of multi-perforate pipe between the head-stock and the tail-stock of the lathe;

C. aligning a strip of stainless steel or other metal wool with the length of the wool strip at an acute angle X to the axis of the multi-perforate pipe;

D. affixing one end of the strip of filter wool to one end of the length of pipe;

E. actuating the lathe to rotate the pipe and simultaneously moving the strip of filter wool along a path parallel to the pipe from the one end of the pipe length L to the other so that the filter wool strip is wound in helical relation on the pipe, from one end of the length of pipe to the other, while maintaining the filter wool strip under tension; and F. repeating step E to apply plural overlapping layers of filter wool to the exterior of the length of pipe, with the strip forming alternate layers of filter wool angularly displaced from each other by an angle of about 2X.

In an apparatus embodiment, the invention relates to a radial-flow fluid filter comprising a length L of multi-perforate pipe. A plurality of overlapping layers of a strip of metal wool are wound helically, under tension, around the exterior of the length of multiperforate pipe; a multi-perforate tubular shell of length L fits tightly around the outermost layer of the metal wool.

DESCRIPTION OF THE PREFERRED EMBODIMENTS

Figure 1:
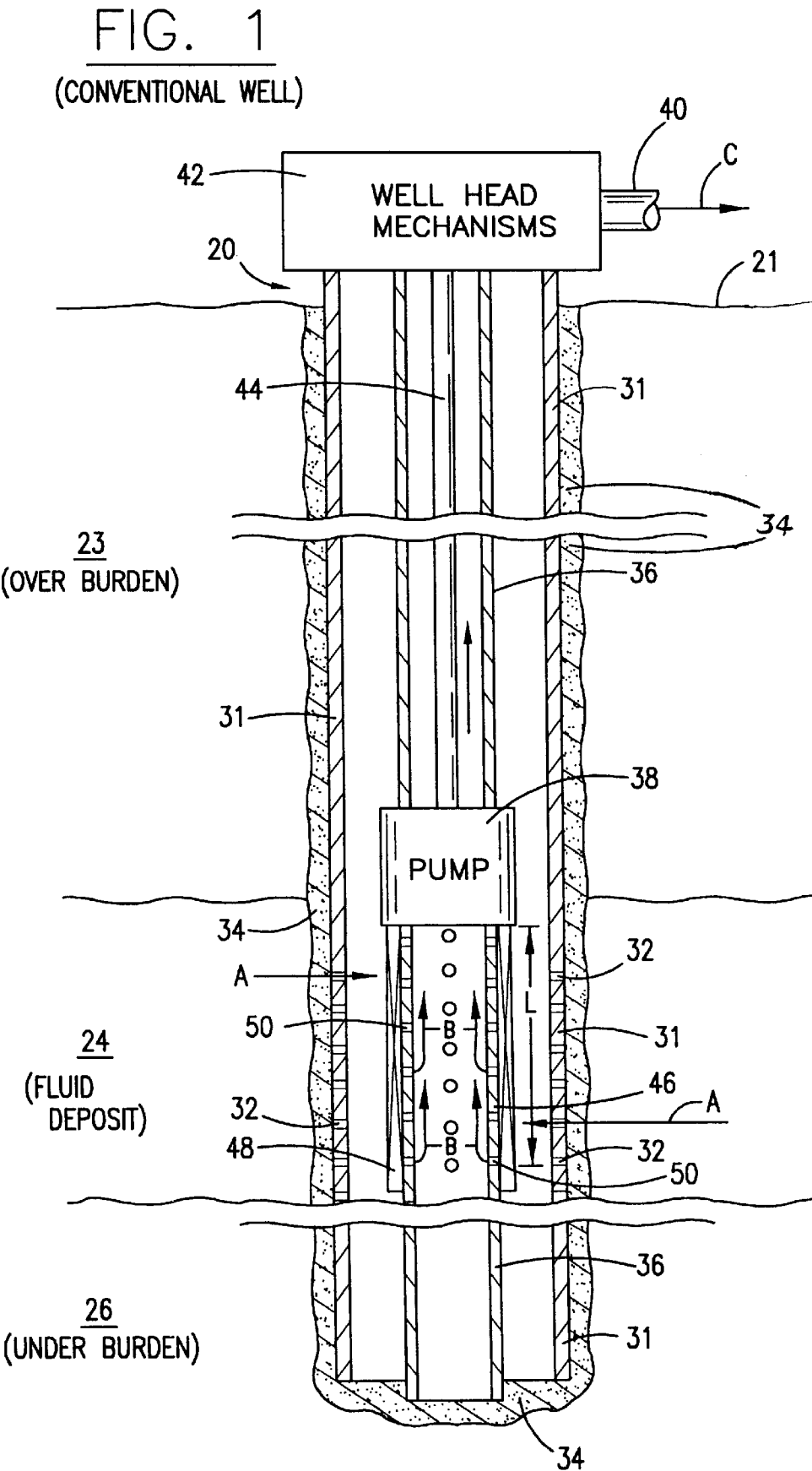
FIG. 1 is a simplified, partly diagrammatic sectional elevation view of a conventional subterranean well.

FIG. 1 affords a simplified partly diagrammatic sectional elevation view of a conventional subterranean well 20. Well 20 may be an oil well, a gas well, a sulfur well, or a water well. Well 20 starts above the earth surface 21 and comprises a well bore extending down through overburden formations 23 and a fluid deposit formation 24 into the underburden formation 26. The well bore for well 20 may be lined with a tubular casing 31 that has a multiplicity of apertures or slots 32 in the pay zone or deposit 24. There may be grout 34 around the exterior of casing 31. Casing 31 is usually a steel tube, though parts of the casing may be covered with electrical insulation or sections of the casing itself may be made of an insulator such as fiber-reinforced plastic (FRP). Grout 34 may be porous enough to pass fluid, may be perforated to allow fluid access to apertures 32 in casing 31, or may be omitted entirely around all or a portion of the casing located within the pay zone, the deposit 24. It will be recognized that dimensions in FIG. 1, as in FIGS. 2–5, have been distorted in some instances for convenience in illustration.

Fluid from well 20 is pumped upwardly through the upper part of a production tubing 36 by a pump 38, and out through a fluid production outlet 40. Outlet 40 extends through a well head 42 that includes the operating mechanisms for the well, particularly the pump rod 44 that extends down from well head 42 to pump 38. Other well constructions may be used.

Below pump 38, in FIG. 1, there is a multi-perforate length of tubing 46 that constitutes a perforated section of the production tubing 36. Tubing section 46 is located within fluid deposit 24, in the same part of well 20 as casing perforations 32. Tubing section 46 and its perforations 50 are within a radial-flow filter 48 that may have the construction shown in the aforementioned Johnston U.S. Pat. No. 2,217, 370.

In operation of well 20, fluid from deposit 24 passes through grout 34 and through perforations 32 into the interior of casing 31, as indicated by arrows A. The fluid then passes through filter 48, which stops sand and other impurities entrained in the fluid. The filtered fluid enters the interior of Section 46 of production tubing 36 through the perforations 50 in this part of the production tubing. From tubing section 46 the fluid is pumped upwardly to the level of surface 21 through the interior of production tubing 36, by pump 38, and flows out through outlet 40, as indicated by arrows B and C. As long as filter 48 has a relatively short axial length L, usually less than one foot (25.4 cm), the filter functions well and can be manufactured by conventional means both expeditiously and economically. But if the length L required for filter 48 is greater, appreciable problems may arise, as discussed above. The object of the present invention is to resolve those problems.

Figure 2:
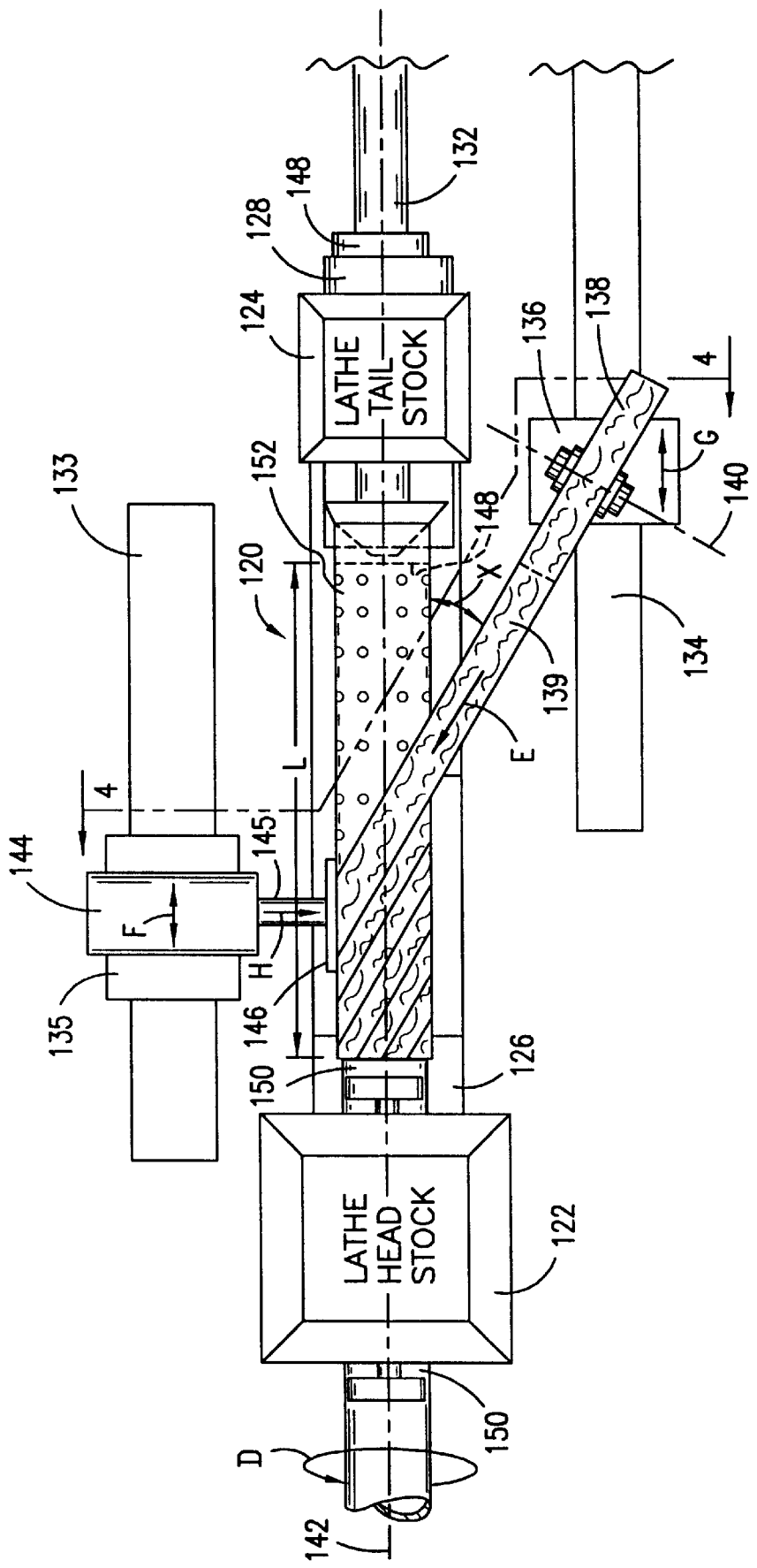
FIG. 2 is a simplified, partly diagrammatic plan view of an intermediate stage in a preferred embodiment of the manufacturing method of the present invention.
Figure 3:
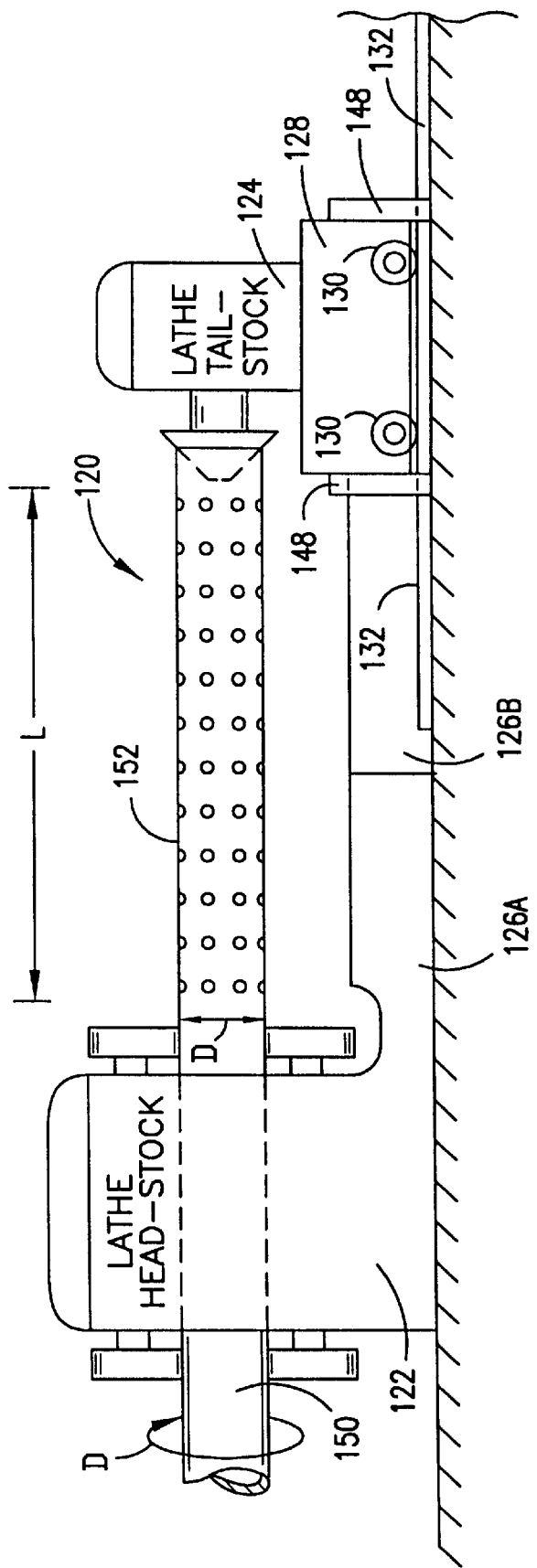
FIG. 3 is a simplified elevation view of the apparatus of FIG. 2 with a part of that apparatus omitted for better illustration of the remainder.

FIGS. 2 and 3 afford simplified, schematic illustrations of an apparatus for manufacture of a radial-flow filter suitable for use in the intake of the production tubing of a subterranean fluid well, pursuant to the present invention. The apparatus of FIGS. 2 and 3 comprises an engine lathe 120 including a head stock 122 spaced from a tail-stock 124 at opposite ends of a bed 126, FIG. 2. Lathe bed 126 may include sections 126A and 126B; see FIG. 3. The tail-stock 124 of lathe 120 may be mounted on a carriage 128 in turn supported by wheels 130 engaging a guide rail 132.

The apparatus illustrated in FIG. 2 further includes two additional guide rails 133 and 134 that are parallel to but spaced from guide rail 132. There are also two carriages 135 and 136 that move along and are guided by rails 133 and 134, respectively. Carriage 136 supports a supply roll 138 of a strip 139 of metal filter wool; the metal wool strip is described more fully hereinafter. The axis 140 of roll 138 is aligned, on carriage 136, so that strip 139 is at an acute angle X relative to the axis 142 of lathe 120. The carriage 135 on rail 133 supports a fluid pressure cylinder 144 having a piston rod 145 that carries a pressure plate 146 that is further described hereinafter. Two stop members 148 may be provided to assure accurate positioning of tail stock carriage along rail 132.

The first step, in the method of the invention, is to provide a preselected length L of a multiperforate pipe, which serves as the central support for the radial-flow filter. In FIGS. 2 and 3, the multiperforate pipe is an intermediate section 152, having a length L, of a longer pipe 150 that is subsequently to serve as the production tubing for a subterranean well. Length L usually exceeds one foot (25.4 cm) but may be shorter. L is always much larger than the outer diameter of pipe 150; it is usually in excess of one foot (25.4 cm). At the outset, pipe 150 is mounted in lathe 120 with the perforated section 152 of the pipe positioned between head stock 122 and tail stock 124, as shown in FIGS. 2 and 3.

Figure 4:
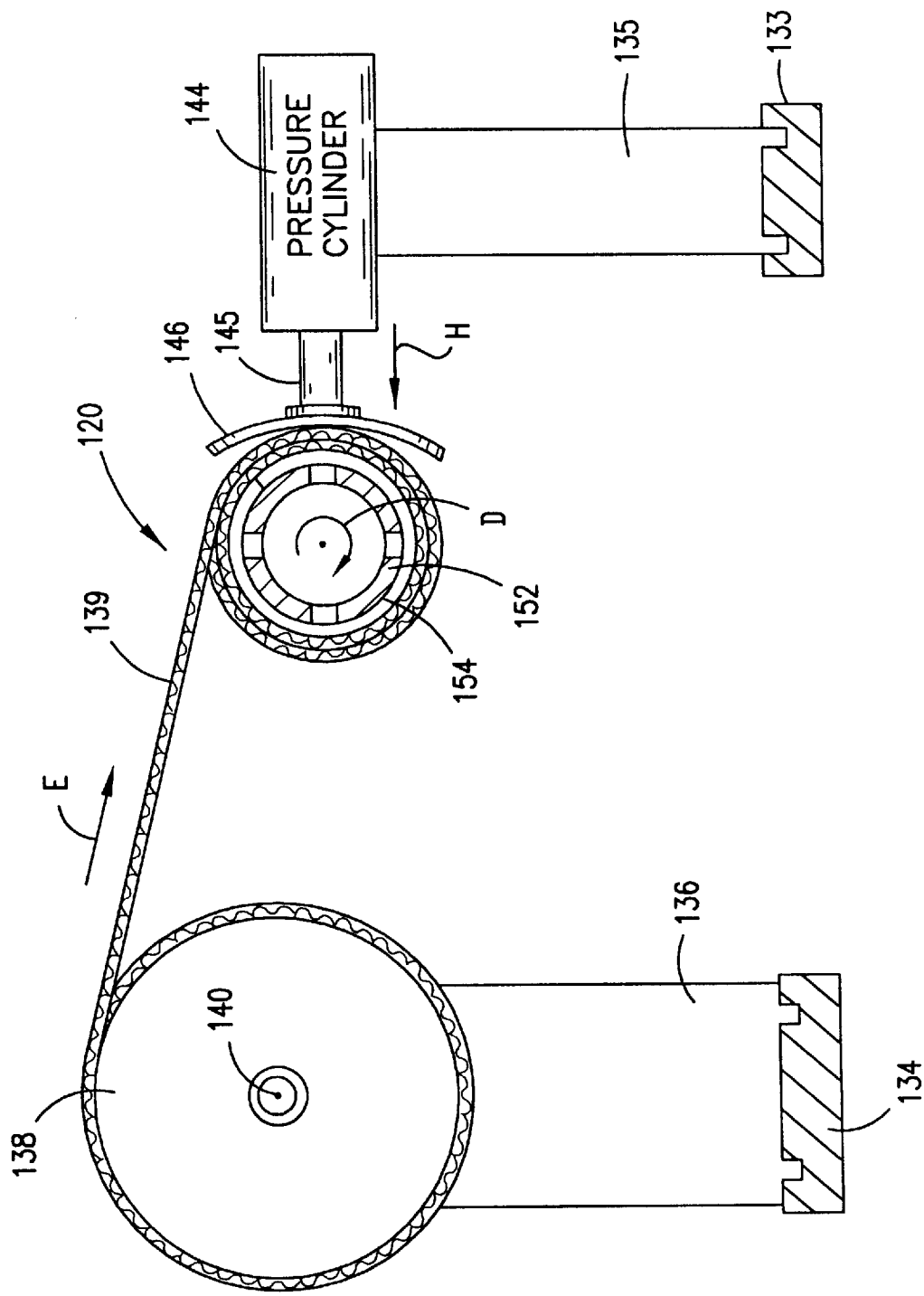
FIG. 4 is a diagrammatic sectional elevation view taken approximately along line 4—4 in FIG. 2.

At this point, before going further, it is usually desirable to mount a single-layer tubular metal mesh foundation member 154, not shown in FIGS. 2 and 3 but shown in FIG. 4, on the section 152 of pipe 150 between the head stock and tail stock of lathe 120. The metal mesh foundation 154 may be mounted on section 152 of pipe 150 before the pipe is mounted in lathe 120.

The next step in the inventive method is to align the filter wool strip 139 at an acute angle X to the pipe axis 142. The end of the metal filter wool strip is then affixed to one end of the length 152 of pipe 150, by welding or other means. In FIG. 2, this has been done by mounting the wool strip storage roll 138 on carriage 136 with its axis 140 at the desired angle to position strip 139 to intersect the pipe axis 142 at the acute angle X. Lathe 120 is now actuated to rotate pipe 150 as indicated by arrow D, FIGS. 2–4. Rotation of pipe 150 pulls the filter wool strip 139 from its storage roll 138 in the direction of arrow E, FIGS. 2 and 4. Strip 139 is maintained under tension while being wrapped helically around pipe section 152; an intermediate point in the wrapping of a first layer of the metal wool strip onto the pipe is illustrated in FIG. 2. Throughout the wrapping operation cylinder 144 and piston 145 urge plate 146 toward the pipe in the direction of arrow H (FIGS. 2 and 4) to aid the maintenance of tension in strip 139 and assure firm packing of layers of the strip around the pipe.

A first layer of the filter wool strip 139 is wound onto the perforated section 152 of pipe 150 throughout its length L. Throughout this operation, strip 139 should be maintained under tension. Plate 146 and its operating mechanism 144, 145 may be sufficient for this purpose; however, some drag on the rotation of the wool supply roll 138 or other means for assuring maintenance of tension on strip 139 may be necessary. Throughout the winding of all layers of the metal wool strip onto the pipe 150, the carriages 144 should be moved along paths parallel to the pipe (see arrows F and G in FIG. 2) so that a uniform helical winding is effected. That is the purpose of guide rails 133 and 134 and their engagement with carriages 135 and 136, respectively.

When a complete first layer of the metal wool strip 139 has been wound tightly onto the full length L of the perforated pipe section 152, the direction of movement of carriages 135 and 136, which has been from left to right as seen in FIG. 2, is reversed. Thereafter, a second layer of filter wool is tightly, helically wound onto the perforated pipe. When the second layer is complete, the direction of movement of the carriages 135 and 136 is again reversed and a third layer is started. The alternate, back-and-forth carriage movements are repeated, with pipe 150 rotating continuously in lathe 120, until the desired number of helical layers of metal wool are superimposed upon each other around the perforate section 152 of pipe 150. The number of layers used is a matter of meeting the filter requirements for a given application; preferably, there should be at least five layers and often as many as ten layers, fifteen layers, or even more.

Figure 5:
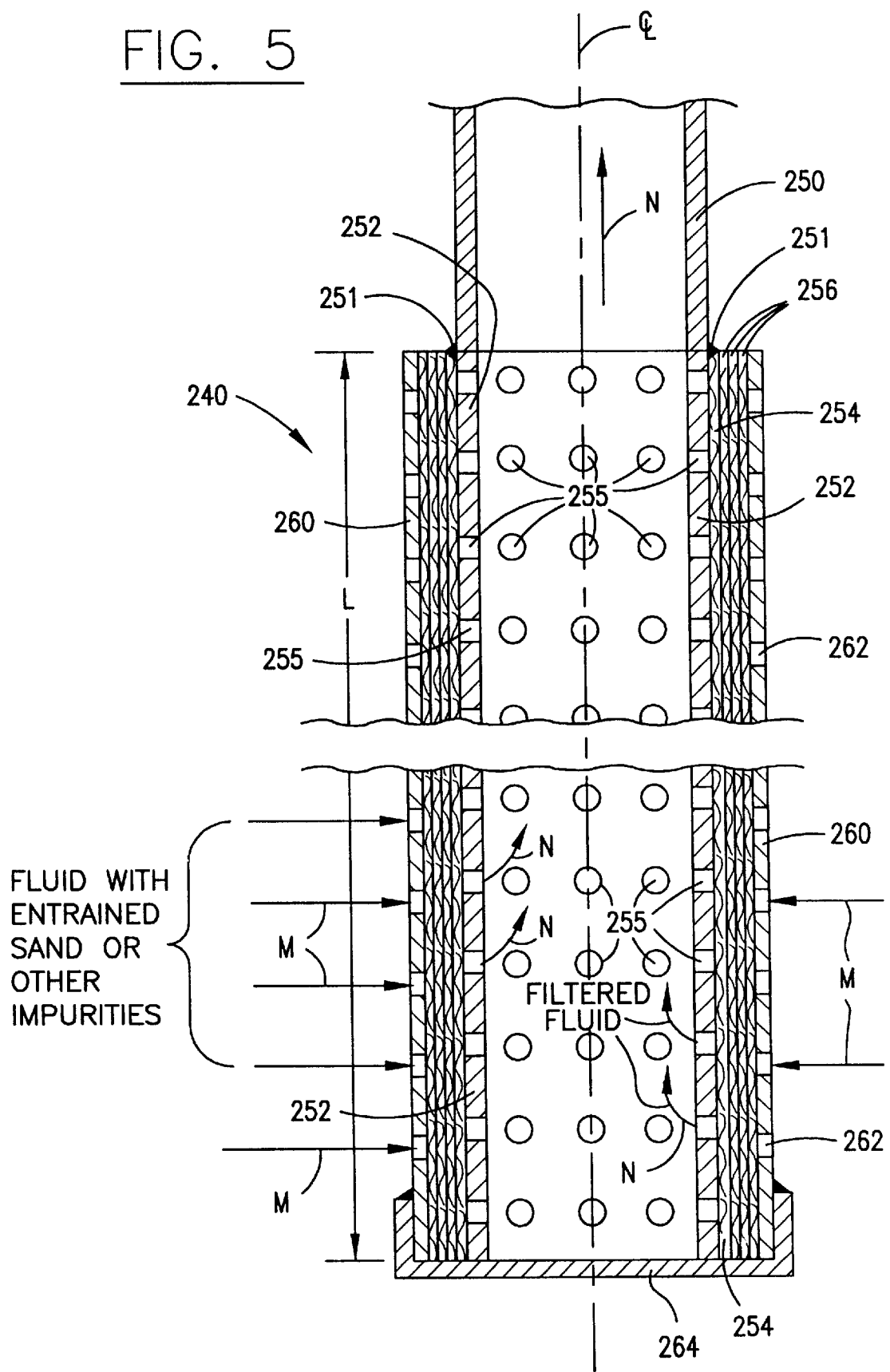
FIG. 5 is a sectional view of a radial-flow filter constructed in accordance with a preferred embodiment of the invention.

FIG. 5 is a longitudinal sectional view of a radial-flow filter 240 constructed in accordance with the invention. It includes a section of multi-perforate pipe 252 having a length L and having an outside diameter corresponding to an imperforate pipe 250; pipe 250 is the production tubing of a fluid well. A weld 251 is shown as joining the multiperforate pipe 252 and imperforate tubing 250 end-to-end so that pipe 252 is, effectively, a continuation of tubing 250.

There is a tubular mesh 254 around the exterior of the multi-perforate pipe 252, throughout the length L in which the perforations 255 appear. Outwardly from the mesh 254 there are a plurality of layers 256 of metal wool fibers disposed in overlapping relation to each other. Layers 256 are each formed from a strip of metal wool fibers wound helically, under tension, around the perforated pipe 252 in the manner described above. Three layers are shown in FIG. 5; many more layers of filter wool may be used, depending on the application in which filter 240 is used. The wool layers filter out sand and other impurities from fluid passing into the interior of the filter and out through pipe 250. A tubular shell 260, having a length L and a multiplicity of apertures or slots 262, fits tightly over the outermost layer in filter wool 256. A cap 264 may be provided at the end of pipe section 252 opposite the outlet afforded by pipe 250.

Operation of filter 240, FIG. 5, is quite simple. Fluid with sand or other entrained impurities enters apertures 262 in shell 260 as indicated by arrows M. The fluid passes through the multiple layers 256 of filter wool, leaving the entrained sand and other impurities behind. The filtered fluid enters the central, open area in pipe 252 through its apertures 255 and flows out of the filter, as indicated by arrows N. Of course, a pressure differential across the plural layers of filter 240 is necessary for sustained, continuous flow, but that is necessary for virtually any filter. Moreover, the flow is reversible, with the same filter effect.

The mesh 254 between pipe 252 and the plural layers 256 of filter wool serves a definite purpose in filter 240. If there is no mesh 254, the fluid may tend, over time, to develop relatively larger passages between at least some of the outer apertures 262, in shell 260, and the inner apertures 255, in pipe 252. That passage enlargement may reduce the effectiveness of filter 240, with the result that less sand and other impurities are filtered out of the fluid traversing the filter.

In all embodiments of the invention, stainless steel wool is preferred. The wool strip may have dimensions to suit a given application; typically, the metal wool strip is formed from fibers having an average thickness of 85 microns and an average length of about one meter or less. The filter wool strip is often four inches (10 cm) wide and about 0.125 inch (0.3 cm) thick, but those dimensions are subject to substantial variation. A common diameter for a storage roll of the wool fiber strip is about 1.5 feet (0.5 meter) when the roll is full.

I claim:

1. The method of manufacturing a radial-flow filter, suitable for use as an input filter for the production tubing of a subterranean fluid well, which production tubing has a predetermined outer diameter D, comprising the following steps:

A. providing a preselected length L of a multi-perforate pipe having an outer diameter D1 corresponding to that of the production tubing for a subterranean fluid well, L being much larger than D1 and usually being in excess of one foot (25.4 cm);

B. mounting the length of multi-perforate pipe in a lathe with the length L of multi-perforate pipe between the headstock and the tailstock of the lathe;

C. aligning a strip of metal fiber wool with the length of the metal wool strip at a given acute angle X to the axis of the multi-perforate pipe;

D. affixing one end of the strip of metal fiber wool to one end of the length of pipe;

E. actuating the lathe to rotate the pipe and simultaneously moving the strip of metal wool along a path parallel to the pipe from the one end of the pipe length L to the other so that the metal wool strip is wound in helical relation on the pipe, at the angle X, from one end of the length L of pipe to the other, while maintaining the metal wool strip under tension; and F. repeating and reversing step E to apply plural overlapping layers of metal wool to the exterior of the length L of pipe, with the strip forming alternate layers of metal wool angularly displaced from each other by an angle of 2X.

2. The method of manufacturing a radial-flow filter, according to claim 1, in which, in step C, the wool strip is metal wool in a roll having a predetermined axis and the axis of the roll is aligned at the acute angle X to the multi-perforate pipe.

3. The method of manufacturing a radial-flow filter, according to claim 1, in which the outermost layer of wool formed in Step F has a given outer diameter D2, and comprising the following additional step;

G. mounting a multi-perforate shell around the outermost layer of metal wool, the shell having an inner diameter approximately equal to the outer diameter D2 of the outermost layer of wool.

4. The method of manufacturing a radial-flow filter, according to claim 1, in which, in step G, the number of repetitions is at least nine so that at least ten layers of metal wool are applied to the exterior of the length of pipe.

5. A radial-flow fluid filter for a subterranean well having a production tubing of a predetermined outer diameter D1, comprising:

a length L of multi-perforate pipe L being much larger than D1, the multiperforate pipe having an outer diameter corresponding to the diameter of the production tubing in a subterranean well;

a plurality of overlapping layers of a continuous strip of fibrous metal filter wool wound helically, under tension, at a predetermined acute angle X around the exterior of the length L of multi-perforate pipe, so that adjacent layers are aligned with each other at an angle 2X; and a multi-perforate tubular shell of length L fitting tightly around the outermost layer of the fibrous metal wool.

6. A radial-flow fluid filter according to claim 5, and further comprising:

a tubular metal mesh encompassing the exterior of the pipe between the pipe and the innermost layer of metal wool.

7. A radial-flow fluid filter according to claim 6, in which the tubular mesh is a woven mesh of stainless steel.

8. A radial-flow fluid filter according to claim 5, in which the metal of the fiber wool layers is stainless steel.

9. A radial-flow fluid filter according to claim 5, and further comprising:

a tubular metal mesh encompassing the exterior of the pipe, between the pipe and at least some of the layers of metal wool.

10. A radial-flow fluid filter according to claim 9, in which the metal of the fiber wool layers is stainless steel.

* * * * *